United States Patent
Snapp

(10) Patent No.: US 9,753,117 B2
(45) Date of Patent: Sep. 5, 2017

(54) SYSTEM AND METHOD FOR WIRELESS BEACON LOCATION VALIDATION

(71) Applicant: West Corporation, Omaha, NE (US)

(72) Inventor: John Lawrence Snapp, Westminster, CO (US)

(73) Assignee: West Corporation, Omaha, NE (US)

( * ) Notice: Subject to any disclaimer, the term of this patent is extended or adjusted under 35 U.S.C. 154(b) by 340 days.

(21) Appl. No.: 14/485,860

(22) Filed: Sep. 15, 2014

(65) Prior Publication Data

US 2016/0077186 A1    Mar. 17, 2016

(51) Int. Cl.
  *G01S 5/02* (2010.01)
  *H04W 4/02* (2009.01)
  *H04W 4/22* (2009.01)

(52) U.S. Cl.
  CPC .......... *G01S 5/0231* (2013.01); *G01S 5/0242* (2013.01); *H04W 4/021* (2013.01); *H04W 4/22* (2013.01)

(58) Field of Classification Search
  CPC .... G01S 5/0231; G01S 5/0242; H04W 4/021; H04W 4/22
  See application file for complete search history.

(56) References Cited

U.S. PATENT DOCUMENTS

| 9,596,600 B2* | 3/2017 | Hernandez | H04W 4/008 |
| 2015/0373482 A1* | 12/2015 | Barnard | H05B 37/0272 370/338 |
| 2016/0007184 A1* | 1/2016 | Kulikov | G01S 5/0252 455/41.2 |
| 2016/0050526 A1* | 2/2016 | Liu | H04W 4/021 455/457 |

* cited by examiner

*Primary Examiner* — Joseph Dean, Jr.

(57) ABSTRACT

The invention discloses a system and method for validating a wireless beacon location stored in a wireless beacon location record is actually proximate to the true location of the wireless beacon. The method includes: (a) receiving a wireless beacon location report with a wireless beacon identifier and a validation location; (b) correlating the wireless beacon location report with a wireless beacon location record by determining whether the beacon identifier in the wireless beacon location report matches the beacon identifier of a record in a plurality of wireless beacon location records; (c) determining whether the validation location received in the wireless beacon location report is proximal to the beacon location stored in the correlated wireless beacon location record, thereupon designating the wireless beacon location stored in the correlated wireless beacon location record as validated.

8 Claims, 6 Drawing Sheets

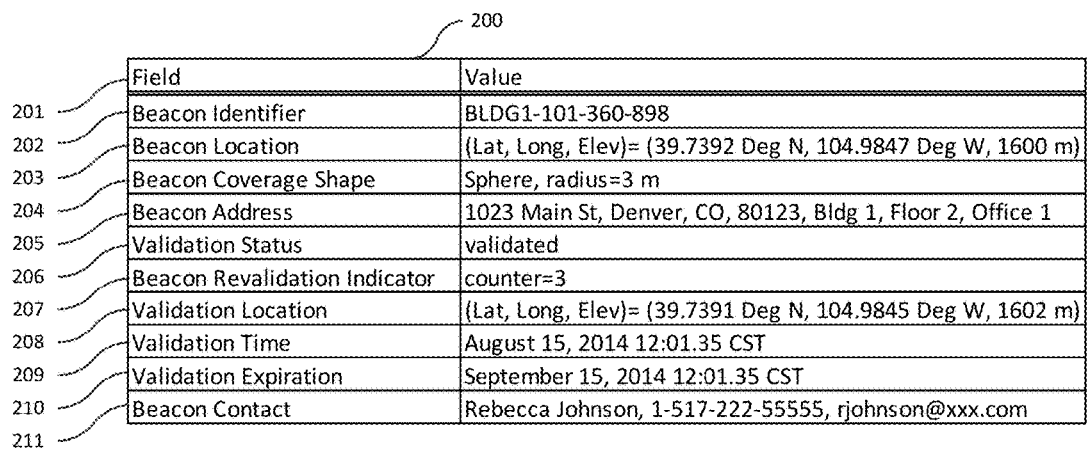

| Field | Value |
|---|---|
| Beacon Identifier | BLDG1-101-360-898 |
| Beacon Location | (Lat, Long, Elev)= (39.7392 Deg N, 104.9847 Deg W, 1600 m) |
| Beacon Coverage Shape | Sphere, radius=3 m |
| Beacon Address | 1023 Main St, Denver, CO, 80123, Bldg 1, Floor 2, Office 1 |
| Validation Status | validated |
| Beacon Revalidation Indicator | counter=3 |
| Validation Location | (Lat, Long, Elev)= (39.7391 Deg N, 104.9845 Deg W, 1602 m) |
| Validation Time | August 15, 2014 12:01.35 CST |
| Validation Expiration | September 15, 2014 12:01.35 CST |
| Beacon Contact | Rebecca Johnson, 1-517-222-55555, rjohnson@xxx.com |

FIG. 2

SYSTEM AND METHOD FOR WIRELESS BEACON LOCATION VALIDATION

FIELD OF THE INVENTION

The present invention is directed to location systems, and especially to validating that a stored wireless beacon location represents the true location of the wireless beacon.

BACKGROUND OF THE INVENTION

A glossary of acronyms and abbreviations associated with emergency services calls is contained in NENA Master Glossary of 9-1-1 Terminology, NENA 00-001, Version 16, dated Aug. 22, 2011 and is incorporated herein by reference in its entirety.

Location information is particularly meaningful to PSAP call takers who are responsible for dispatching emergency assistance such as police, fire and medical personnel. In the case of 9-1-1 calls from a traditional wireline phone, the dispatch address is fixed and stored in an ALI database. In the case of 9-1-1 calls from a wireless phone, there is no fixed address associated with the wireless phone. To enable PSAP call takers to dispatch emergency assistance to the wireless caller, wireless carriers have implemented a variety of location-determining technologies to provide the caller's latitude and longitude (hereafter referred to as "X,Y").

Having precise caller X,Y location is critical for ensuring that first responders arrive at the correct location. The FCC recognized the importance of accurate X,Y location in 1996 by adopting rules that require wireless carriers to implement E911 location-determining services. The FCC divided its wireless E911 service requirements into two stages. The initial stage—Phase I—required wireless carriers to deliver, by April 1998, E911 service that includes the telephone number of the wireless 9-1-1 caller and the location of the cell site or base station that received the call. Phase II required delivery, under a phased-in schedule, now extending until January 2019, of E911 service that includes X,Y of the 9-1-1 caller within specific accuracy and reliability parameters, depending on the location technology that the carriers have chosen, as follows:
  (a) Using network-based technologies: within 100 meters for 67 percent of calls, and 300 meters for 90 percent of calls;
  (b) Using handset-based technologies: within 50 meters for 67 percent of calls, and 150 meters for 90 percent of calls.

Despite the FCC rules requiring improvements in location accuracy, there are multiple reasons why an X,Y provided for a wireless 9-1-1 call to the PSAP does not result in a useful address to which to dispatch emergency assistance (hereafter referred to as a "dispatch address"). For some wireless 9-1-1 calls, only Phase I X,Y is made available to the PSAP in a timely manner and Phase I X,Y is not sufficient to determine a dispatch address. For wireless 9-1-1 calls that are routed to a PSAP with Phase II location, the accuracy of that location is often outside the 100 meter range (or 50 meters for carriers using handset-based technologies) for 67% of calls as required by the FCC. This is particularly true for wireless 9-1-1 calls made indoors where GPS coverage is poor. Moreover, an X,Y needs to be converted at the PSAP into a dispatch address by using mapping or GIS tools to identify the closest street address to the X,Y. Depending on the precision and accuracy of the X,Y, the area described by the X,Y may cover many street addresses. The problem of identifying the correct dispatch address is exacerbated when an emergency occurs inside of a building with many rooms or multiple floors, each with many rooms. Effectively responding to emergencies that occur inside of a building using a street address, even when the street address is correct, is frequently inadequate.

The need for better location accuracy for wireless 9-1-1 calls made from indoor environments has gained recognition by the FCC who on Feb. 20, 2014 issued a Third Notice of Proposed Rulemaking, PS-Docket No. 07-114, and proposed new requirements for wireless carriers. This FCC proposal also adds a requirement for provision of a vertical location (Z-axis or elevation) information that would enable first responders to identify floor level for most calls from multi-story buildings. The proposed requirements call for delivery to PSAPs of in-building location information at the room or office suite level.

One approach for providing PSAPs with in-building location information is to use short range wireless beacons that transmit a unique beacon identifier. In this approach, the location information is not provided directly by the beacon, rather the beacon merely provides a unique beacon identifier. Since location information is not being provided by the beacon, this approach requires establishing, maintaining and storing an association between a beacon identifier and its location. For simplicity, this beacon identifier-location association management and storage facility is called a beacon location database, although file-based and memory-based implementations are contemplated. This approach requires a method for managing the contents of the beacon location database.

Validating the wireless beacon location stored in the beacon location database ensures the wireless beacon location stored in the beacon location database is actually proximate to the true location. Without validating the wireless beacon location stored in the beacon location database, a PSAP call taker could accidentally dispatch emergency assistance personnel to the wrong location. Validating the wireless beacon location stored in the beacon location database could also prevent the fraudulent practice known in the industry as 9-1-1 "SWATing". This dangerous practice results in a PSAP call taker being tricked into dispatching an armed SWAT response to an innocent address. Validating the wireless beacon location stored in the beacon location database could also be used to detect and report if a wireless beacon has been moved or stolen.

To ensure the integrity and accuracy of the beacon location database, there is a need for a system and a method to validate that the wireless beacon location stored in the beacon location database represents the true location of the wireless beacon.

SUMMARY OF THE INVENTION

In accordance with one aspect of this invention, disclosed is a method for validating a wireless beacon location within a plurality of stored wireless beacon location records. The method includes: (a) receiving a wireless beacon location report with a wireless beacon identifier and a validation location; (b) correlating the wireless beacon location report with a wireless beacon location record by determining whether the beacon identifier in the wireless beacon location report matches the beacon identifier of a record in a plurality of wireless beacon location records; (c) determining whether the validation location received in the wireless beacon location report is proximal to the beacon location stored in the correlated wireless beacon location record, thereupon designating the wireless beacon location stored in the correlated wireless beacon location record as validated.

In accordance with another aspect of this invention, disclosed is a method for validating a wireless beacon location within a plurality of stored wireless beacon location records. The method includes: (a) receiving from a device a wireless beacon identification report with a beacon identifier; (b) correlating the wireless beacon identification report with a wireless beacon location record by determining whether the beacon identifier in the wireless beacon identification report matches the beacon identifier of a record in a plurality of wireless beacon location records; (c) determining whether the wireless beacon location in the correlated wireless beacon location record is not validated, thereupon continuing with the method which further includes: (i) sending a wireless beacon location request to the device; (ii) receiving a wireless beacon location report with a beacon identifier and a validation location; (iii) correlating the wireless beacon location report with a wireless beacon location record by determining whether the beacon identifier in the wireless beacon location report matches the beacon identifier of a record in a plurality of wireless beacon location records; and (iv) determining whether the validation location received in the wireless beacon location report is proximal to the wireless beacon location stored in the correlated wireless beacon location record, thereupon designating the wireless beacon location stored in the correlated wireless beacon location record as validated.

In accordance with another aspect of this invention, disclosed is a method for validating a wireless beacon location within a plurality of stored wireless beacon location records. The method includes: (a) receiving from a device a wireless beacon identification report with a beacon identifier and a beacon revalidation indicator; (b) correlating the wireless beacon identification report with a wireless beacon location record by determining whether the beacon identifier in the wireless beacon identification report matches the beacon identifier of a record in a plurality of wireless beacon location records; (c) determining whether the beacon revalidation indicator received in the wireless beacon identification report indicates the wireless beacon location in the correlated wireless beacon location record is not valid, thereupon continuing with the method which further includes: (i) designating the wireless beacon location in the correlated wireless beacon location record as not validated; (ii) setting the beacon revalidation indicator in the correlated wireless beacon location record to the received revalidation indicator; (iii) sending a wireless beacon location request to the device; (iv) receiving a wireless beacon location report with a beacon identifier and a validation location; (v) correlating the wireless beacon location report with a wireless beacon location record by determining whether the beacon identifier in the wireless beacon location report matches the beacon identifier of a record in a plurality of wireless beacon location records; and (vi) determining whether the validation location received in the wireless beacon location report is proximal to the wireless beacon location stored in the correlated wireless beacon location record, thereupon designating the wireless beacon location stored in the correlated wireless beacon location record as validated.

In accordance with another aspect of this invention, disclosed is a system for validating a wireless beacon location within a plurality of stored wireless beacon location records. The system includes a processor. The processor in the system performs operations including: (a) receiving from a device a wireless beacon identification report with a beacon identifier and a beacon revalidation indicator; (b) correlating the wireless beacon identification report with a wireless beacon location record by determining whether the beacon identifier in the wireless beacon identification report matches the beacon identifier of a record in a plurality of wireless beacon location records; (c) determining whether the beacon revalidation indicator received in the wireless beacon identification report indicates the wireless beacon location in the correlated wireless beacon location record is not valid, thereupon continuing by performing further operations including: (i) designating the wireless beacon location in the correlated wireless beacon location record as not validated; (ii) setting the beacon revalidation indicator in the correlated wireless beacon location record to the received revalidation indicator; (iii) sending a wireless beacon location request to the device; (iv) receiving a wireless beacon location report with a beacon identifier and a validation location; (v) correlating the wireless beacon location report with a wireless beacon location record by determining whether the beacon identifier in the wireless beacon location report matches the beacon identifier of a record in a plurality of wireless beacon location records; and (vi) determining whether the validation location received in the wireless beacon location report is proximal to the wireless beacon location stored in the correlated wireless beacon location record, thereupon designating the wireless beacon location stored in the correlated wireless beacon location record as validated.

Further features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

The accompanying drawings, which are incorporated into and form a part of the specification, illustrate a preferred embodiment of the present invention and, together with the description, serve to explain the principles of the invention. In the drawings:

FIG. 2 is a diagram illustrating a wireless beacon location record;

DETAILED DESCRIPTION

For purposes of illustration, by way of example and not by way of limitation, the present invention will be discussed in the context of an emergency service network in the United States, commonly referred to as a 9-1-1 network. The teachings of the present invention are equally applicable, useful and novel in other special number calling systems, such as maintenance service networks, college campus security networks and other networks and in other application where validated wireless beacon records may be used to provide locations associated with beacons.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
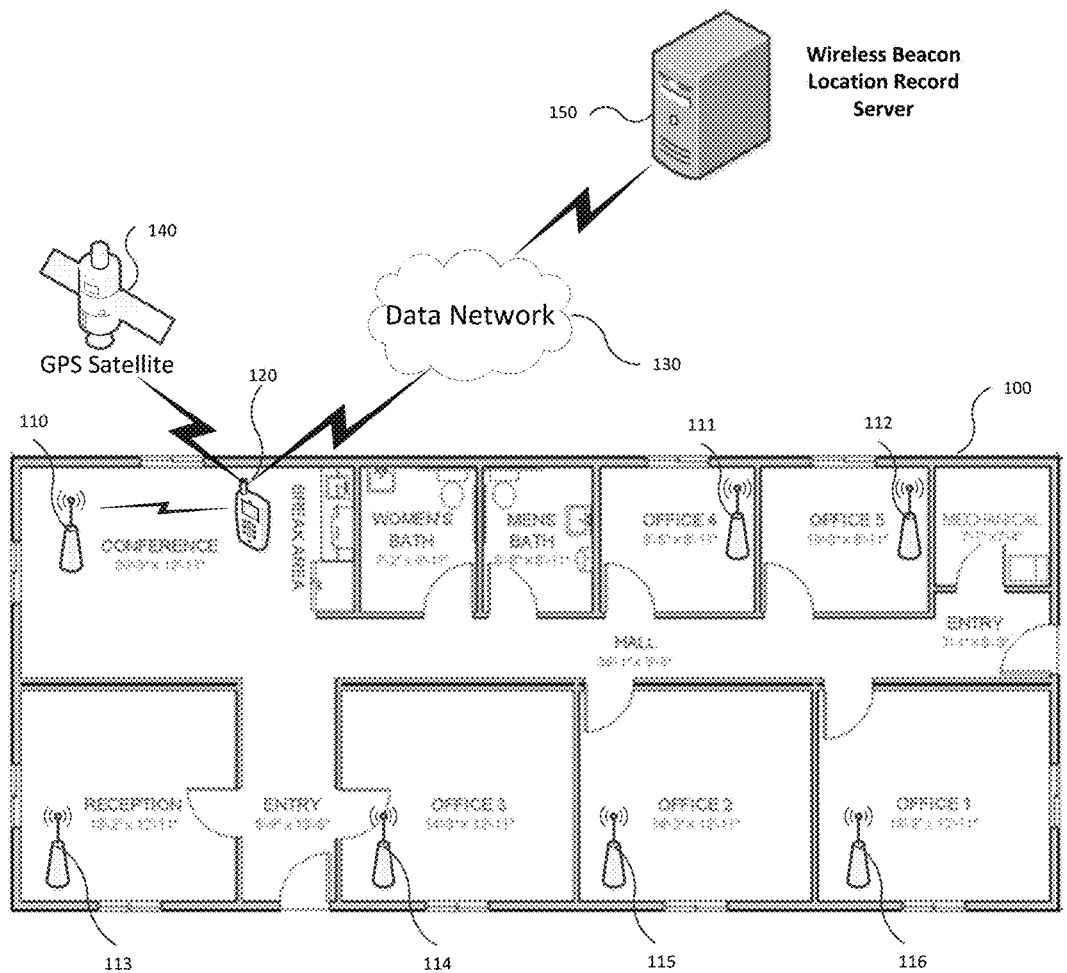
FIG. 1 is a diagram illustrating an example environment in which the invention can be used; the environment of a multi-story office building.

FIG. 1 is a diagram illustrating wireless beacon location server 150 coupled to Beacon Reporting Device 120 via data network 130. By way of example and not by way of limitation, Beacon Reporting Device 120 is within a multi-story office building which has floorplan 100. Other environments include, but are not limited to, single story and multi-story instances of the following: single family homes, condominiums, apartment buildings, office buildings, schools, corporate campuses, university campuses, warehouses, sports stadiums, outdoor venues and transportation structures such as airports, train stations, bus stations and ferry terminals.

By way of example and not by way of limitation, the office building with floorplan 100 has the street address "1023 Main St., Denver, Colo., 80123". In the present state of E911 technology, this street address does not enable an emergency responder to proceed directly to a floor or room within this building. To provide an emergency responder with more precise location information in floorplan 100, wireless beacons 110, 111, 112, 113, 114, 115, and 116 are placed in various offices and other rooms with the intention of providing a dispatch address at the office/room level. If someone then places a 9-1-1 call in the vicinity of one or more of wireless beacons 110, 111, 112, 113, 114, 115, and 116 with a mobile phone that reports at least one detected beacon identifier, the beacon address associated with a detected beacon identifier is used to provide more precise location information.

In the preferred embodiment wireless beacons 110, 111, 112, 113, 114, 115, and 116 employ Bluetooth Low Energy (LE) transmitters. Each wireless beacon transmits a unique beacon identifier. By way of example and not by way of limitation, other embodiments of wireless beacons 110, 111, 112, 113, 114, 115, and 116 may employ other passive or active RF technologies, such as RFID, ANT, ANT+, LTE D2D and WiFi. Alternatively, wireless beacons 110, 111, 112, 113, 114, 115, and 116 may employ passive or active optical or acoustic technologies. The wireless beacon technology is not significant to the present invention, rather the significance of the wireless beacon is that it serves as a short-range location reference point.

Beacon Reporting Device 120 employs a technology capable of coupling with one or more of wireless beacons 110, 111, 112, 113, 114, 115, and 116 for the purpose or detecting one or more beacon identifiers. In the preferred embodiment, Beacon Reporting Device 120 is a cell phone with Bluetooth LE technology.

Beacon Reporting Device 120 is coupled to Wireless Beacon Location Record Server 150 via data network 130. By way of example and not by way of limitation, Beacon Reporting Device 120 may be coupled to Wireless Beacon Location Record Server 150 via a wireless network such as WiFi, GPRS or LTE or a wired network such as Ethernet.

In the preferred embodiment, Beacon Reporting Device 120 is coupled to one or more GPS satellites 140 so that it may determine its physical location. In other embodiments, Beacon Reporting Device 120 may employ other means for determining its physical location such as receiving its location from a cellular network, or by reporting details of observed WiFi access points to an external server which in return provides, an X,Y,Z or X,Y location based on location data that has been previously associated with the reported WiFi access points.

In the preferred embodiment, Beacon Reporting Device 120 periodically scans for nearby wireless beacons and maintains a list of nearby beacon identifiers. Upon detecting a beacon identifier which is not currently on its list of nearby beacon identifiers, Beacon Reporting Device 120 performs steps comprising: (1) adding the beacon identifier to its list of nearby beacon identifiers, (2) determining its current physical location preferably using GPS satellites 140, and (3) sending a wireless beacon location report to the Wireless Beacon Location Record Server 150 via data network 130. The wireless beacon location report is comprised of the beacon identifier and validation location. In the preferred embodiment, the validation location is the current X,Y,Z or X,Y physical location of Beacon Reporting Device 120. In another embodiment, by way of example, and not by way of limitation, the validation location is a previously determined physical address of Beacon Reporting Device 120. In another embodiment, Beacon Reporting Device 120, upon adding a beacon identifier to its list or nearby beacon identifiers, sends a beacon identification report instead of a beacon location report to Wireless Beacon Location Record Server 150. The wireless beacon identification report is comprised of the beacon identifier; the validation location is excluded from the wireless beacon identification report. In this embodiment, Wireless Beacon Location Record Server 150 may respond to receiving a beacon identification report by sending a wireless beacon location request to Beacon Reporting Device 120.

FIG. 2 is a diagram illustrating a wireless beacon location record. A wireless beacon location record 200 comprises multiple fields wherein each field is associated with one or more values as shown in record heading 201.

The value for field Beacon Identifier 202 identifies a specific wireless beacon. This value is transmitted by a wireless beacon and is detected by Wireless Beacon Reporting Device 120 as shown in FIG. 1 when it is within range of the wireless beacon. In the preferred embodiment, Beacon Identifier 202 is a MAC address. In other embodiments, by way of example and not by way of limitation, Beacon Identifier 202 is a serial number or a universally unique identifier (UUID).

The value for field Beacon Location 203 represents the physical location of the wireless beacon. In the preferred embodiment, this value comprises a latitude, longitude and elevation (also referred to as an X,Y,Z) value. In another embodiment, this value comprises a latitude and longitude (also referred to as an X,Y). In other embodiments, by way of example and not by way of limitation, this value includes coordinates in a Cartesian or polar coordinate system, or the identification of a nearby reference point such as a WiFi access point for which a relative or absolute position is determined.

The value for field Beacon Coverage Shape 204 describes the wireless coverage area of the wireless beacon. In the preferred embodiment, this value represents a 3-dimensional volume such as an extruded polygon, cube or sphere. In another embodiment, by way of example and not by way of limitation, this value represents a 2-dimensional shape such as a polygon, rectangle or circle.

The value for field Beacon Address 205 represents the address associated with the wireless beacon. In the preferred embodiment, this address includes sufficient detail to serve as a 9-1-1 dispatch address and comprises a street address, a building identification, a floor identification and a room identification. By way of example, and not by way of limitation, Beacon Address 205 for wireless beacon 101 depicted in FIG. 1. is "1023 Main St., Denver, Colo., 80123, floor 2, Conference Room". In other embodiments, by way of example and not by way of limitation, Beacon Address 205 is a street address, a description of a location such as an outdoor environment, a warehouse, or a location in a conveyance such as vehicle, an airplane, a ship or a train.

The value for Validation Status 206 represents the validation state of Beacon Location 203. In the preferred embodiment, this value is either "validated" or "unvalidated". Validation Status 206 with a value of "validated" indicates Beacon Reporting Device 120 as shown in FIG. 1 has sent a beacon location report to Wireless Beacon Location Record Server 150 as shown in FIG. 1, and that the validation location contained in the beacon location report is proximate to value for Beacon Location 203.

The value for Beacon Revalidation Indicator 207 determines whether Beacon Location 203 needs to be validated again. In the preferred embodiment, this value is compared to a beacon revalidation indicator value reported by a Wireless Beacon Reporting Device 120 shown in FIG. 1. and is a count of the number times a wireless beacon has detected movement, through a movement sensor such as an accelerometer or switch. Other events which would increment the count include, but are not limited to, power-cycling of the wireless beacon, and reconfiguration of operating parameters of the wireless beacon such as RF signal power or RF coverage shape. In another embodiment, by way of example and not by way of limitation, this value is either "moved" or "stationary".

The value for Validation Location 208 comprises a validated location received from a Wireless Beacon Reporting Device 120 shown in FIG. 1 in a beacon location report.

The value for Validation Time 209 represents the most recent date and time that Beacon Location 203 has been validated. In the preferred embodiment, this is a date and time which comprises year, month, day, hour, minute, second and time zone. In another embodiment, by way of example and not by way of limitation, this is a date and time which comprises the number of seconds that have elapsed since 00:00:00 Coordinated Universal Time (UTC), Thursday, 1 Jan. 1970.

The value for Validation Expiration 210 is a date and time that represents when Validation Status 206 value will be set to "unvalidated". In the preferred embodiment, this is a date and time which comprises year, month, day, hour, minute, second and time zone. In another embodiment, by way of example and not by way of limitation, this is a date and time which comprises the number of seconds that have elapsed since 00:00:00 Coordinated Universal Time (UTC), Thursday, 1 Jan. 1970.

The value for Beacon Contact 211 contains contact information for an entity responsible for the wireless beacon. In the preferred embodiment, this entity is a person. Other embodiments of this entity, by way of example and not by way of limitation, include a business entity, an organizational entity, login credentials for an administrative server interface or a computer system from which the data associated with the wireless beacon location record is remotely managed. In the preferred embodiment, when Beacon Reporting Device 120 reports a validation location that is not proximate to Beacon Location 203 as determined by Wireless Beacon Location Server 150, the Wireless Beacon Location Server 150 notifies Beacon Contact 211. In the preferred embodiment, Wireless Beacon Location Server 150 sends such notification by email. In other embodiments, by way of example and not by way of limitation, such notification is delivered by text message, by computer generated phone call, by a customer service representative, by a notification on an administrative server interface or as a system-to-system notification to a computer system from which the data associated with wireless beacon location record 200 is remotely managed.

Figure 3:
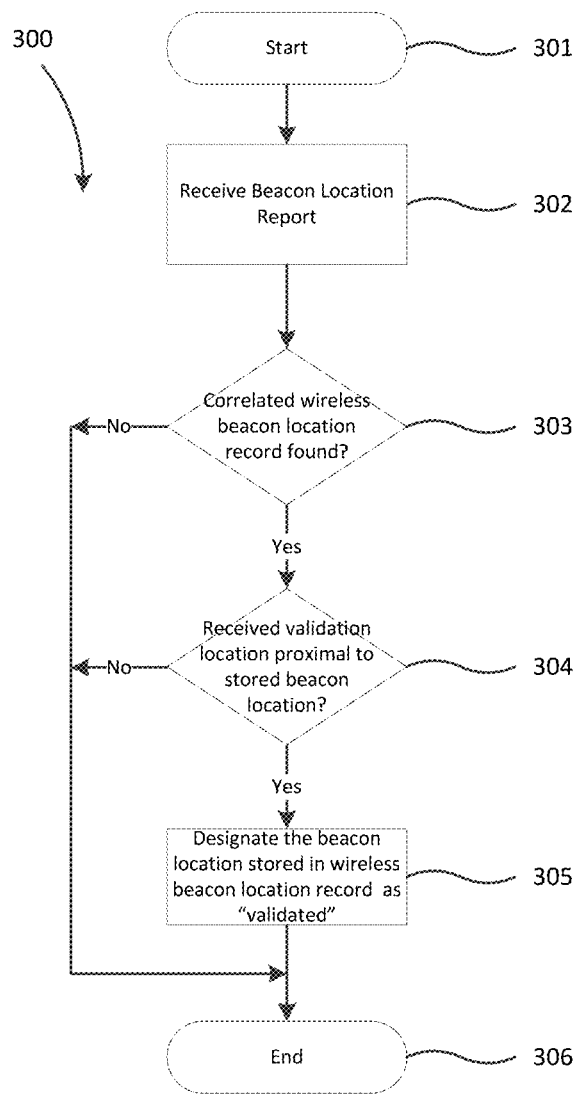
FIG. 3 is a flowchart illustrating one method of the present invention.

FIG. 3 is a flowchart illustrating one of the methods in the present invention. Flowchart 300 shows the steps for receiving and processing a beacon location report and starts at step 301. At step 302, a beacon location report is received. At step 303, a plurality of stored wireless beacon location records is searched for a record with the same beacon identifier as the beacon identifier contained in the received beacon location report. If a correlated record is not found, processing ends at step 306. If a correlated record is found, processing continues to step 304 where the validation location in the received beacon location report is compared to the correlated record. As previously described in FIG. 2, Beacon Location 203 and Beacon Coverage Shape 204 values specify a location as either a 2-dimensional shape or a 3-dimensional volume. The comparison performed at step 304 determines whether the received beacon location is proximal to Beacon Location 203. If the validation location is not found to be proximal to Beacon Location 203, processing ends at step 306. If the validation location is found to be proximal to Beacon Location 203, processing continues to step 305 where Validation Status 206 of the correlated wireless beacon location record is set to "validated". Processing then ends at step 306. One skilled in the art will recognize that there are multiple methods for implementing the validation logic of step 304.

In an alternative embodiment of flowchart 300, after step 305 is performed, additional steps are performed, as follows: (1) Validation Location 208 is updated with the validation location reported in the beacon location report, (2) Validation Time 209 is updated with the current date and time, and (3) Validation Expiration 210 is updated to a future date and time at which time Validation Status 206 will be set to "unvalidated".

Figure 4:
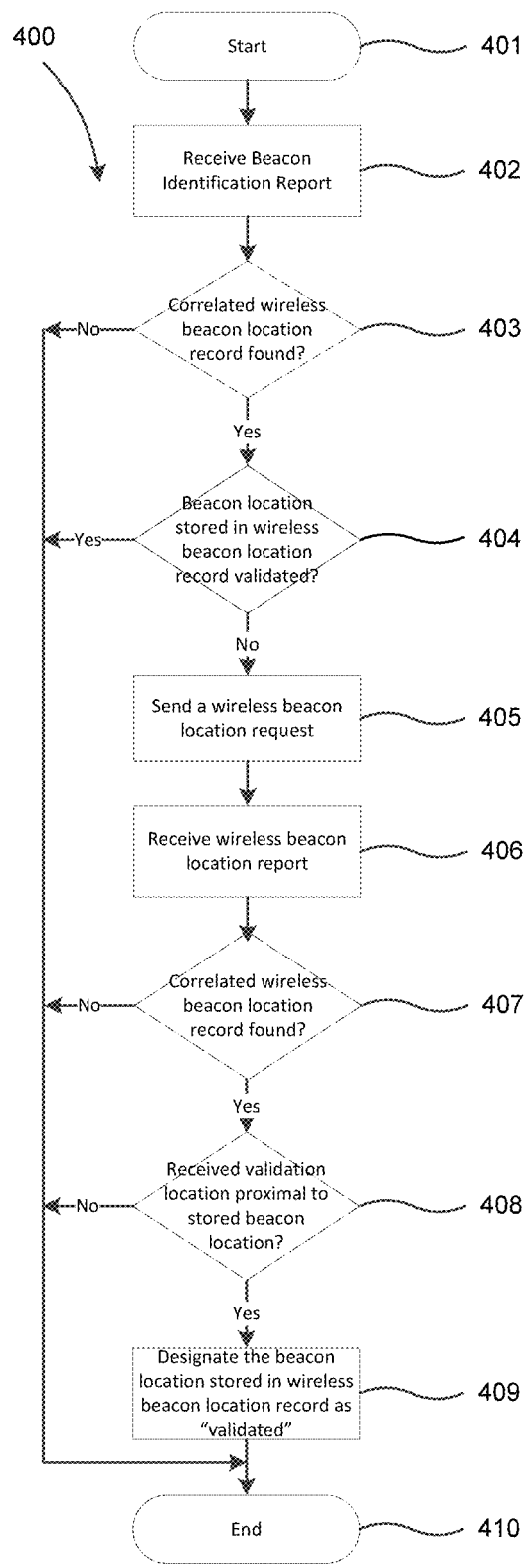
FIG. 4 is a flowchart illustrating a second method of the present invention.

FIG. 4 is a flowchart illustrating a second method of the present invention. Flowchart 400 shows the steps for receiving and processing a beacon identification report and starts at step 401. At step 402, a beacon identification report is received. At step 403, a plurality of stored wireless beacon location records is searched for a record with the same beacon identifier as the beacon identifier contained in the received beacon identification report. If a correlated record is not found, processing ends at step 410. If a correlated record is found, processing continues to step 404 to determine the Validation Status 206 value of the correlated of the correlated wireless beacon location record. If the Validation Status 206 value is "validated", processing ends at step 410.

If the Validation Status 206 value is "unvalidated", a wireless beacon location request is sent at step 405 and processing then continues at step 406.

At step 406, a beacon location report is received. At step 407, a plurality of stored wireless beacon location records is searched for a record with the same beacon identifier as the beacon identifier contained in the received beacon location report. If a correlated record is not found, processing ends at step 410. If a correlated record is found, processing continues to step 408 where the validation location in the received beacon location report is compared to the correlated record. As previously described in FIG. 2, Beacon Location 203 and Beacon Coverage Shape 204 values specify a location as either a 2-dimensionsal shape or a 3-dimensional volume. The comparison performed at step 408 determines whether the received beacon location is proximal to Beacon Location 203. If the validation location is not found to be proximal to Beacon Location 203, processing ends at step 410. If the validation location is found to be proximal to Beacon Location 203, processing continues to step 409 where Validation Status 206 of the correlated wireless beacon location record is set to "validated". Processing then ends at step 410. One skilled in the art will recognize that there are multiple methods for implementing the validation logic of step 408.

In an alternative embodiment of flowchart 400, after step 409 is performed, additional steps are performed, as follows: (1) Validation Location 208 is updated with the validation location reported in the beacon location report, (2) Validation Time 209 is updated with the current date and time, and (3) Validation Expiration 210 is updated to a future date and time at which time Validation Status 206 will be set to "unvalidated".

Figure 5:
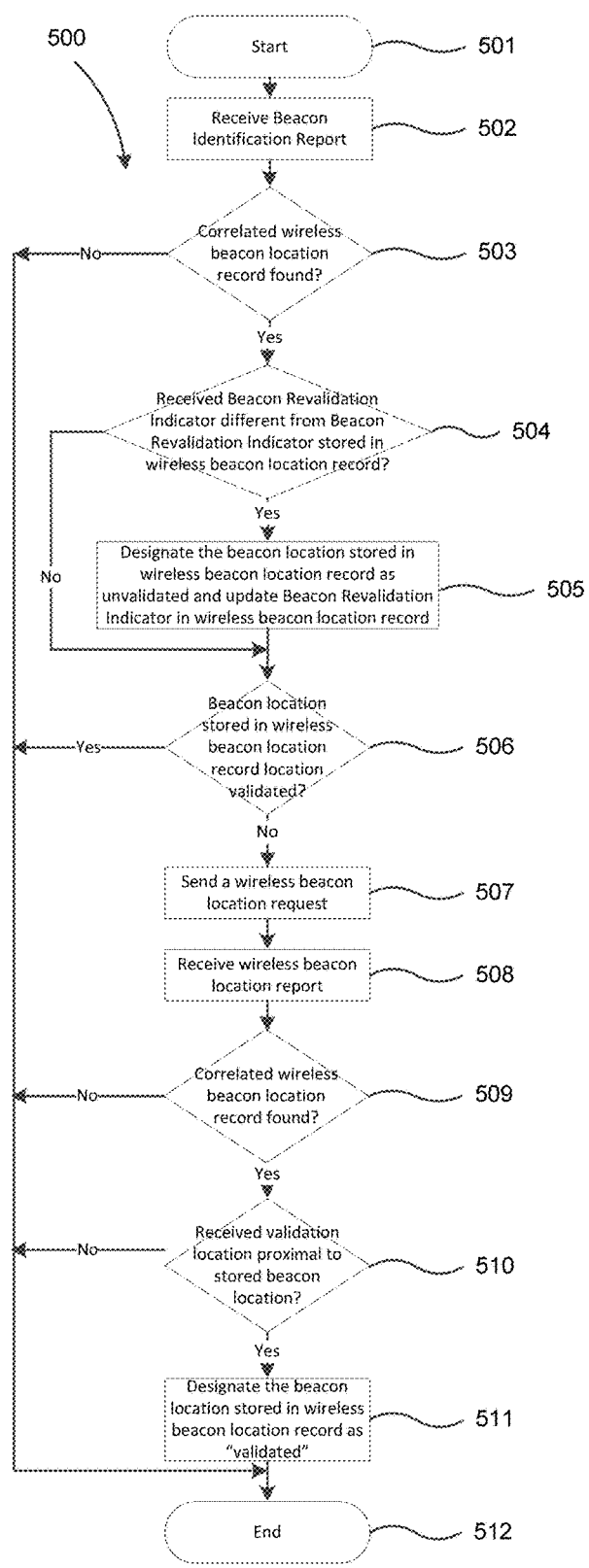
FIG. 5 is a flowchart illustrating a third method of the present invention.

FIG. 5 is a flowchart illustrating a third method of the present invention. Flowchart 500 shows the steps for receiving and processing a beacon identification report and starts at step 501. At step 502, a beacon identification report is received. At step 503, a plurality of stored wireless beacon location records is searched for a record with the same beacon identifier as the beacon identifier contained in the received beacon identification report. If a correlated record is not found, processing ends at step 512. If a correlated record is found, processing continues to step 504. At step 504, the beacon revalidation indicator in the beacon identification report is compared to Beacon Revalidation Indicator 207 in the correlated wireless beacon location record. If the values are the same, processing continues to step 506, otherwise, processing continues at step 505. At step 505, Validation Status 206 in the correlated wireless beacon location record is set to "unvalidated" and Beacon Revalidation Indicator 207 is updated with the beacon revalidation indicator value received in the beacon identification report.

At step 506, the Validation Status 206 value of the correlated of the correlated wireless beacon location record is determined. If the Validation Status 206 value is "validated", processing ends at step 512. If the Validation Status 206 value is "unvalidated", a wireless beacon location request is sent at step 507 and then processing continues at step 508.

At step 508, a beacon location report is received. At step 509, a plurality of stored wireless beacon location records is searched for a record with the same beacon identifier as the beacon identifier contained in the received beacon location report. If a correlated record is not found, processing ends at step 512. If a correlated record is found, processing continues to step 510 where the validation location in the received beacon location report is compared to the correlated record. As previously described in FIG. 2, Beacon Location 203 and Beacon Coverage Shape 204 values specify a location as either a 2-dimensionsal shape or a 3-dimensional volume. The comparison performed at step 510 determines whether the received beacon location is proximal to Beacon Location 203. If the validation location is not found to be proximal to Beacon Location 203, processing ends at step 512. If the validation location is found to be proximal to Beacon Location 203, processing continues to step 511 where Validation Status 206 of the correlated wireless beacon location record is set to "validated". Processing then ends at step 512. One skilled in the art will recognize that there are multiple methods for implementing the validation logic of step 510.

In an alternative embodiment of Flowchart 500, after step 511 is performed, additional steps are performed, as follows: (1) Validation Location 208 is updated with the validation location reported in the beacon location report, (2) Validation Time 209 is updated with the current date and time, and (3) Validation Expiration 210 is updated to a future date and time at which time Validation Status 206 will be set to "unvalidated".

Figure 6:
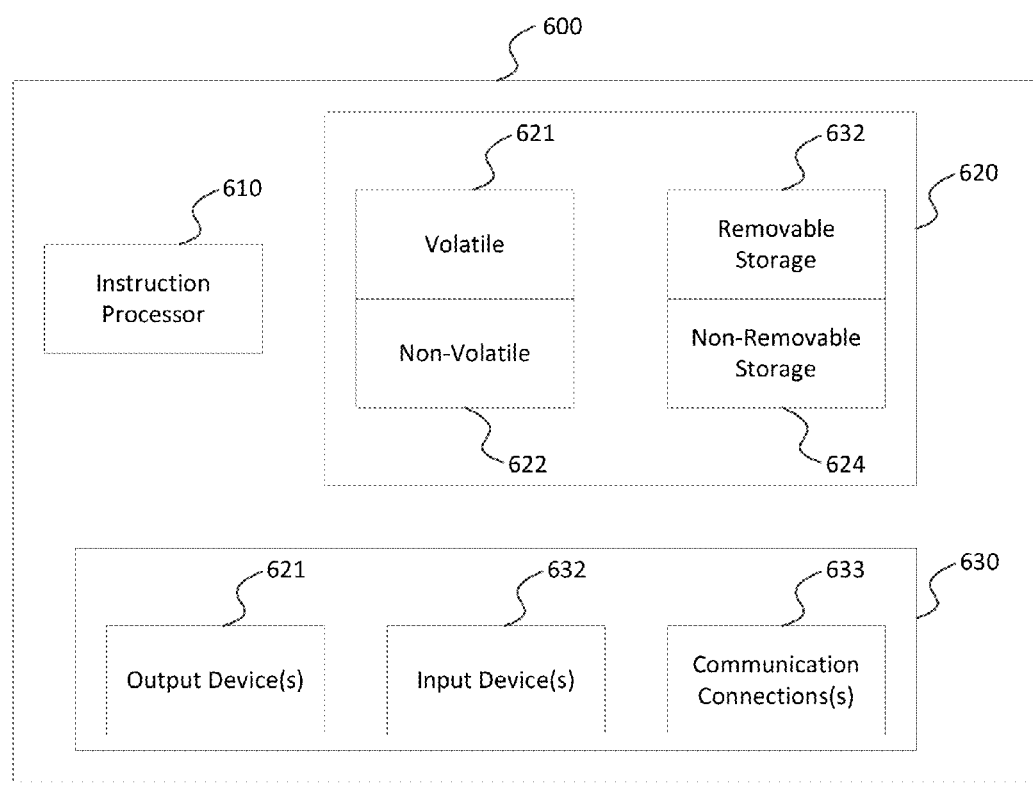
FIG. 6 is a block diagram of an example processor for effecting the present invention.

FIG. 6 is a block diagram of an example processor 600 in accordance with the Wireless Beacon Location Record Server 150 as shown in FIG. 1. It is emphasized that the block diagram depicted in FIG. 6 is exemplary and not intended to imply a specific implementation. Thus, the processor 600 can be implemented in a single processor or multiple processors. Multiple processors can be distributed or centrally located. Multiple processors can communicate wirelessly, via hard wire, or any combination thereof.

Processor 600 comprises an instruction processor 610, a memory 620, and an input/output 630. The instruction processor unit 610, memory 620, and input/output 630 are coupled together (coupling not shown in FIG. 6) to allow communication among them. The input/output 630 is capable of providing and/or receiving components, commands, and/or instructions, utilized to, for example, receive beacon location reports, receive beacon identification reports, send wireless beacon location requests and process wireless beacon location records.

The processor 600 is preferably implemented as a client processor and/or a server processor. In this exemplary basic configuration, the processor 600 includes at least one instruction processor 610 and memory 620. The memory 620 stores any information utilized in conjunction with beacon location reports, beacon identification reports, wireless beacon location requests, wireless beacon location records, etc. For example, as described above, the memory is capable of storing processing instructions for querying databases and validating wireless beacon location records. Depending upon the configuration and type of processor, the memory 620 can be volatile (such as RAM) 621, nonvolatile (such as ROM, flash memory, etc.) 622, or a combination thereof. The processor 600 can have additional features/functionality. For example, the processor 600 can include additional storage (removable storage 623 and/or non-removable storage 624) including, but not limited to, magnetic or optical disks, tape, flash, smart cards or a combination thereof. Computer storage media, such as memory and storage elements 620, 621, 622, 623, and 624, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 600. Any such computer storage media may be part of the processor 600.

The processor 600 includes the communications connection(s) 633 that allow the processor 600 to communicate with other devices, for example the Beacon Reporting Device 120 via data network 130 as illustrated in FIG. 1. Communications connection(s) 633 is an example of communication media. Communication media typically embody computer-readable instructions, data structures, program modules or other data in a modulated data signal such as a carrier wave or other transport mechanism and includes any information delivery media. For purposes of this patent specification, the term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 600 also can have input device(s) 632 such as keyboard, keypad, mouse, pen, voice input device, touch input device, etc. Output device(s) 631 such as a display, speakers, printer, etc. also can be included.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A method for validating a wireless beacon location stored within a wireless beacon location record, said wireless beacon location record comprising said wireless beacon location, a beacon identifier and a beacon revalidation indicator; the method comprising:
   a) receiving from a device a wireless beacon identification report comprising a beacon identifier and a beacon revalidation indicator;
   b) correlating said wireless beacon identification report with a wireless beacon location record by determining whether the beacon identifier in said wireless beacon identification report matches the beacon identifier of a record in a plurality of wireless beacon location records;
   c) determining whether the beacon revalidation indicator received in said wireless beacon identification report indicates the wireless beacon location in said correlated wireless beacon location record is not valid, thereupon continuing with the method further comprising:
      (i) designating the wireless beacon location in said correlated wireless beacon location record as not validated;
      (ii) setting the beacon revalidation indicator in said correlated wireless beacon location record to the received revalidation indicator;
      (iii) sending a wireless beacon location request to said device;
      (iv) receiving a wireless beacon location report comprising a beacon identifier and a validation location;
      (v) correlating said wireless beacon location report with a wireless beacon location record by determining whether the beacon identifier in said wireless beacon location report matches the beacon identifier of a record in a plurality of wireless beacon location records; and
      (vi) determining whether the validation location received in said wireless beacon location report is proximal to the wireless beacon location stored in said correlated wireless beacon location record, thereupon designating the wireless beacon location stored in said correlated wireless beacon location record as validated.

2. The method of claim 1 wherein said beacon revalidation indicator comprises an event counter value and wherein step (c) determines the validity of the wireless beacon location in said correlated wireless beacon location record based on the received beacon revalidation indicator matching the beacon revalidation indicator of said correlated wireless location record.

3. The method of claim 1 wherein said wireless beacon location in said wireless beacon location record comprises a latitude and longitude and said validation location comprises a latitude and longitude.

4. The method of claim 3 wherein said wireless beacon location record further comprises a two-dimensional shape description.

5. The method of claim 1 wherein said wireless beacon location in said wireless beacon location record further comprises an elevation and said validation location further comprises an elevation.

6. The method of claim 5 wherein said wireless beacon location record further comprises a three-dimensional volume description.

7. The method of claim 1 wherein said wireless beacon location record further comprises a beacon address.

8. A system for validating a wireless beacon location stored within a wireless beacon location record, said wireless beacon location record comprising said wireless beacon location and a beacon identifier; the system comprising data processing apparatus coupled with a device; said data processing apparatus being operated such that it performs operations comprising:
   a) receiving from a device a wireless beacon identification report comprising a beacon identifier and a beacon revalidation indicator;
   b) correlating said wireless beacon identification report with a wireless beacon location record by determining whether the beacon identifier in said wireless beacon identification report matches the beacon identifier of a record in a plurality of wireless beacon location records;
   c) determining whether the beacon revalidation indicator received in said wireless beacon identification report indicates the wireless beacon location in said correlated wireless beacon location record is not valid, thereupon continuing by performing further operations comprising:
      (i) designating the wireless beacon location in said correlated wireless beacon location record as not validated;
      (ii) setting the beacon revalidation indicator in said correlated wireless beacon location record to the received revalidation indicator;

(iii) sending a wireless beacon location request to said device;
(iv) receiving a wireless beacon location report comprising a beacon identifier and a validation location;
(v) correlating said wireless beacon location report with a wireless beacon location record by determining whether the beacon identifier in said wireless beacon location report matches the beacon identifier of a record in a plurality of wireless beacon location records; and
(vi) determining whether the validation location received in said wireless beacon location report is proximal to the wireless beacon location stored in said correlated wireless beacon location record, thereupon designating the wireless beacon location stored in said correlated wireless beacon location record as validated.

\* \* \* \* \*